United States Patent [19]
Kikly

[11] Patent Number: 5,747,911
[45] Date of Patent: May 5, 1998

[54] BRUSH HOLDER

[75] Inventor: Ned L. Kikly, Vandalia, Ohio

[73] Assignee: ITT Automotive Electrical Systems, Inc., Auburn Hills, Mich.

[21] Appl. No.: 315,426

[22] Filed: Sep. 30, 1994

[51] Int. Cl.[6] .................................................. H02K 13/00
[52] U.S. Cl. ........................... 310/239; 310/240; 310/242
[58] Field of Search .................................... 310/239, 240, 310/242, 247

[56] References Cited

U.S. PATENT DOCUMENTS

| | | | |
|---|---|---|---|
| 4,293,789 | 10/1981 | King | 310/239 |
| 4,694,214 | 9/1987 | Stewart | 310/239 |
| 4,806,025 | 2/1989 | Kamiyama et al. | 384/202 |
| 4,866,322 | 9/1989 | Baumeister et al. | 310/239 |
| 5,004,943 | 4/1991 | Gagneux | 310/239 |
| 5,444,320 | 8/1995 | Clarke et al. | 310/239 |

*Primary Examiner*—Thomas M. Dougherty
*Assistant Examiner*—K. E. Tamai
*Attorney, Agent, or Firm*—J. Gordon Lewis; Thomas N. Twomey

[57] ABSTRACT

Brush holder for a DC motor is disclosed as having at least one brush box for housing a brush biased radially toward an opening through the brush holder. A brush retainer is provided for preventing the brush from entering the opening of the brush holder until the rotor of the DC motor is assembled to the stator, where the brush retainer is releasably attached to an annular wall defining the brush holder opening. The brush holder also includes means for capturing the brush retainer once it is displaced axially during assembly of the rotor to the stator, as well as means for retaining a printed circuit board in position between the brush holder and the stator end cap.

12 Claims, 2 Drawing Sheets

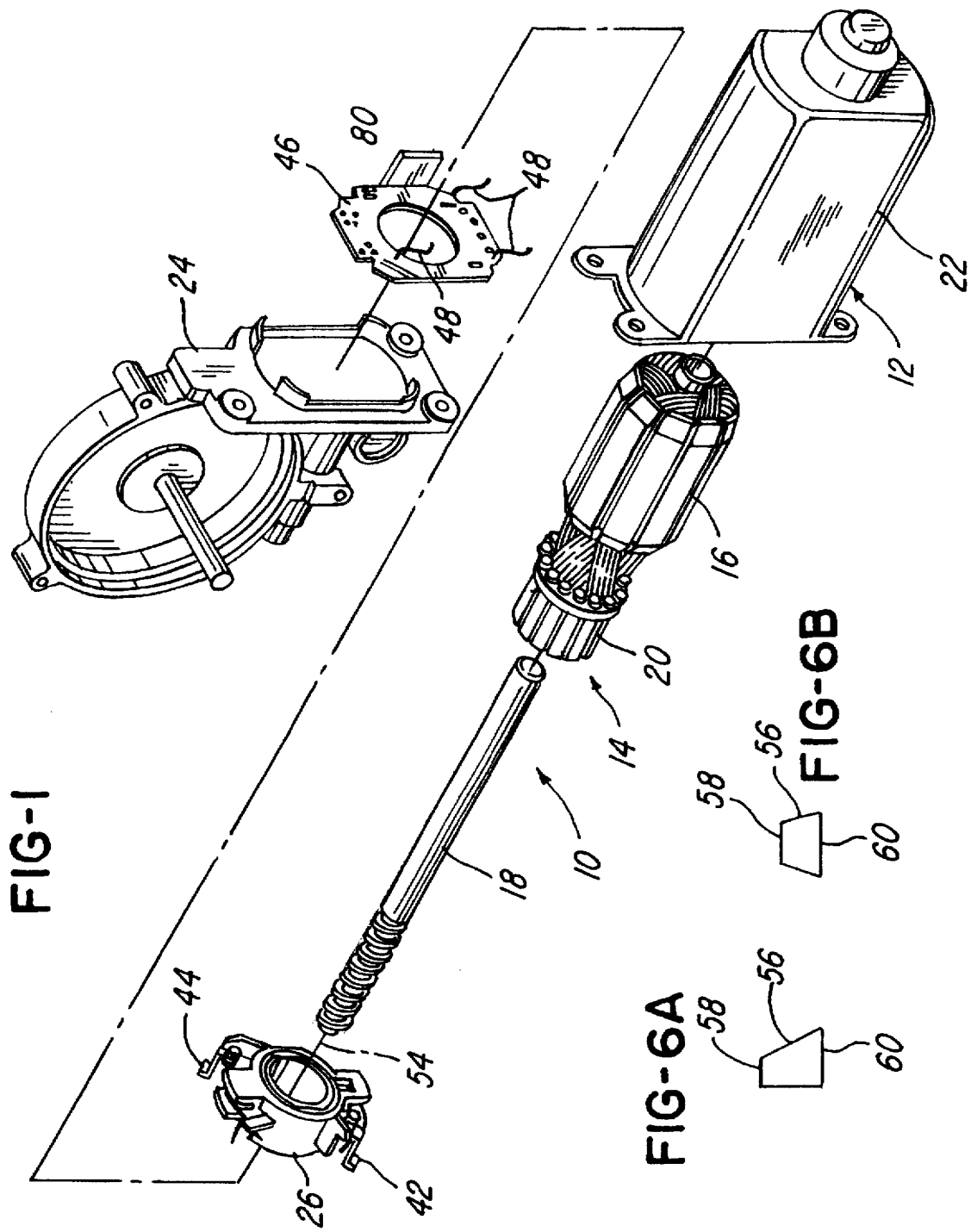

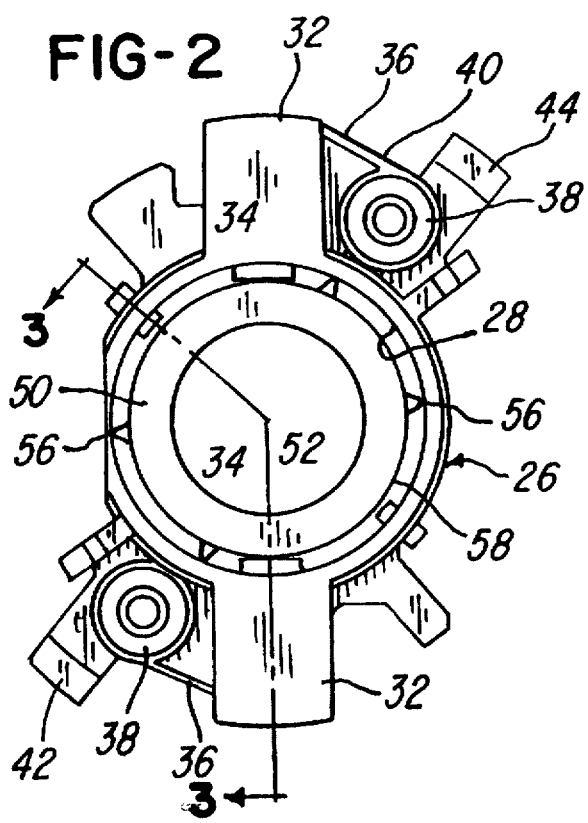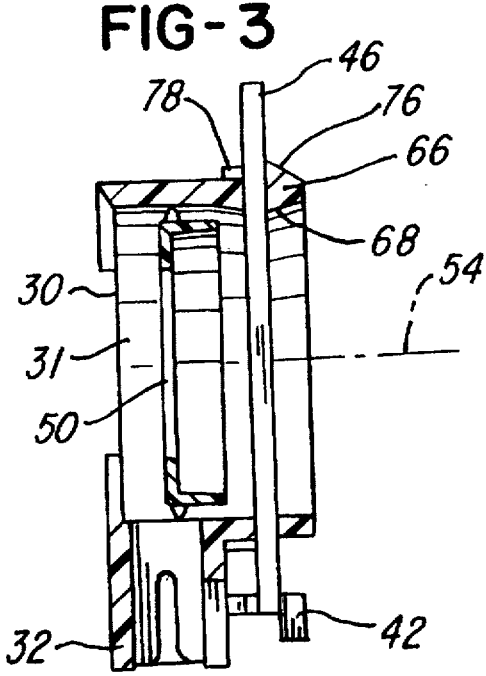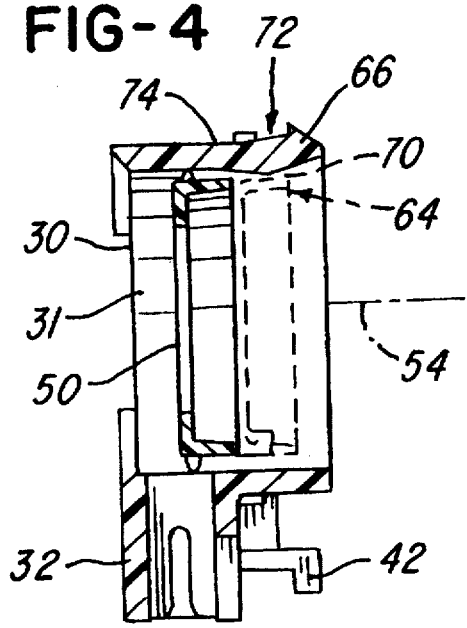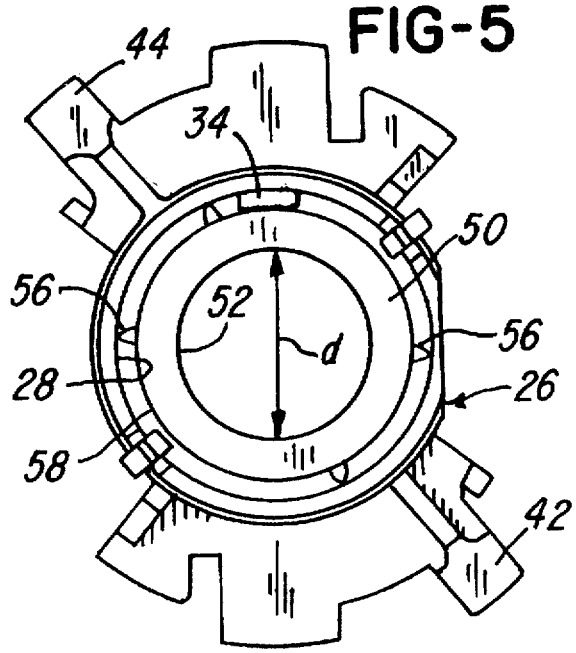

BRUSH HOLDER

BACKGROUND OF THE INVENTION

1. Field of the Invention

The present invention relates to motors and, more particularly, to a brush holder for a direct-current (DC) motor including a brush retainer releasably attached thereto and a means for capturing the brush retainer when displaced during assembly of the DC motor.

2. Description of Related Art

As is well known, a dynamoelectric machine in the form of a direct-current (DC) motor includes a rotor and a stator. The rotor generally includes an armature core with windings, as well as a shaft extending from the armature core, and a commutator. The stator, which has a magnetic field therein, generally surrounds the rotor in the form of a yoke or cylindrical frame. Brushes are also provided and supported from the stator by a rigging. By maintaining contact between the brushes and the commutator, current is transferred to the armature core, which inspires an electromagnetic field that causes rotation of the rotor.

In order to maintain the brushes in firm contact with the commutator, they have generally been positioned in a brush holder and positively biased toward the center thereof by springs or the like. A recurring problem with such dynamoelectric machines has been their assembly since the commutators will necessarily have a diameter greater than the space between the inwardly biased brushes. Consequently, brush retainers have been utilized to hold the brushes in place while the armature shaft is properly positioned within the stator, thereby leaving the opening through the brush holder unobstructed. Generally, such brush retainers have openings therethrough which accommodate the axial positioning of the armature shaft, but not the larger diameter of the commutator. Accordingly, the commutator serves to displace the brush retainer as the rotor is inserted axially into the stator, whereby the brushes are released from the brush retainer and biased into contact with the commutator.

It has been found that the assembly process of such DC motors has suffered in at least two respects. First, prior art DC motors have not provided a means for capturing the brush retainer when it has been displaced, thereby creating an aesthetically displeasing rattle and the potential for debris which may interrupt the contact between the brushes and commutator or otherwise contaminate the rotor. Secondly, brush retainers have characteristically been implemented as a separate piece requiring manual insertion, thereby subjecting the assembler to a time-consuming operation having a high propensity for mis-alignment.

Further, it should be noted that a printed circuit board may be utilized with the DC motor, in conjunction with a switch or other control, to provide an interface with the brushes. For example, it is contemplated that a DC motor like that of the present invention may be utilized as a power windowlift motor in a vehicle, but it is not limited to such an application. Generally, such a circuit board is positioned adjacent the rear surface of the brush holder and maintained in that location between the brush holder and a seat within the end cap of the stator. However, due to the delicate nature of the circuit board, it is preferred that it be maintained in a stationary position instead of being subjected to shifting between the brush holder and end cap.

Accordingly, one object of the present invention is to provide a brush holder for a DC motor which includes a means for capturing a brush retainer when it has been displaced during machine assembly.

A second object of the present invention is to provide a brush holder for a DC motor including a pre-positioned brush retainer within an opening thereof to provide automatic alignment during assembly and eliminate the need for manual insertion.

Yet another object of the present invention is to provide a brush holder for a DC motor having a means for retaining a printed circuit board associated therewith in a stationary position.

SUMMARY OF THE INVENTION

A brush holder for a DC motor is disclosed as having at least one brush box for housing a brush biased radially toward an opening through the brush holder. A brush retainer is provided for preventing the brush from entering the opening of the brush holder until the rotor of the DC motor is assembled to the stator, where the brush retainer is releasably attached to an annular wall defining the brush holder opening. The brush holder also includes means for capturing the brush retainer once it is displaced axially during assembly of the rotor to the stator, as well as means for retaining a printed circuit board in position between the brush holder and the stator end cap.

BRIEF DESCRIPTION OF THE DRAWING

While the specification concludes with claims particularly pointing out and distinctly claiming the present invention, it is believed that the same will be better understood from the following description taken in conjunction with the accompanying drawing in which:

FIG. 1 is an exploded perspective view of a DC motor including a brush holder of the present invention;

FIG. 2 is a front view of the brush holder of the present invention;

FIG. 3 is a cross-sectional view of the brush holder of FIG. 2, taken along lines 3—3, where a brush retainer is shown as being positioned within an opening in the brush holder prior to assembly of the stator and rotor, as well as a printed circuit board being retained in a stationary position on the rear side of the brush holder;

FIG. 4 is a cross-sectional view of the brush holder as seen in FIG. 3, where the brush retainer is shown as being positioned within a capturing means of the brush holder after assembly of the stator and rotor, with the printed circuit board being eliminated for clarity;

FIG. 5 is a rear view of the brush holder of FIG. 2;

FIG. 6A is a side view of a first embodiment of the breakaway tabs shown in FIGS. 2-5; and FIG. 6B is a second embodiment of the breakaway tabs shown in FIGS. 2-5.

DETAILED DESCRIPTION OF THE INVENTION

Referring now to the drawing in detail, wherein identical numerals indicate the same elements throughout the figures, FIG. 1 depicts a dynamoelectric machine 10 in the form of a direct current (DC) motor which includes a stator 12 and a rotor 14. More specifically, rotor 14 includes an armature core 16, an armature shaft 18 which extends through armature core 16, and a commutator 20 positioned on armature shaft 18 adjacent armature core 16. Stator 12, as shown in FIG. 1, has an elongated, hollow portion 22 containing magnets therein (not shown) and an end cap portion 24 to which elongated portion 22 is connected. It will be understood that when DC motor 10 is assembled, rotor 14 will be surrounded by stator 12.

A brush holder 26 is provided which is positioned within end cap portion 24 of stator 12. It will be seen that brush holder 26 has a central opening 28 therethrough (see FIGS. 2 and 5) defined by an annular wall 30 (see FIGS. 3 and 4). At least one, and preferably two or more brush boxes 32 are provided on brush holder 26 for housing brushes 34, which are biased radially inward toward central opening 28. As is known in the art, brushes 34 may be biased by spring members 36, which are preferably attached at one end to a connector 38 extending from a front surface 40 of brush holder 26 (see FIG. 2). In this way, the free end of spring member 36 is able to bias brush 34 toward central opening 28. It will further be seen that brush holder 26 includes a pair of leg members 42 and 44 which better enable brush holder 26 to be seated within end cap portion 24 of stator 12.

A printed circuit board 46 is further provided in order to permit a connection between an electric power source (not shown) and brushes 34 by means of leads 48 (see FIG. 1) as well as act as a media for holding a circuit protector and other electronic devices. Accordingly, it will be understood that the current from the electric power source is then able to be supplied to brushes 34, whereupon such current is then transferred to commutator 20. The current received by commutator 20 then acts upon the windings of armature core 16 so as to induce an electromagnetic field between armature core 16 and the windings in stator 12, which causes rotor 14 to rotate. Although not seen, armature shaft 18 preferably is engaged with a bearing within end cap portion 24 of stator 12, whereby the rotation of rotor 14 is able to provide useful work. With respect to the present application, DC motor 10 is specifically utilized as a powerlift mechanism for the windows of an automobile, but it will be understood that DC motor 10 could be used in any number of applications and is not limited thereto.

In order to prevent biased brushes 34 from entering central opening 28 of brush holder 26 and interfering with the assembly of rotor 14 and stator 12, a brush retainer 50 is provided. As best seen in FIGS. 2 and 5, brush retainer 50 is positioned within central opening 28 of brush holder 26 and preferably is substantially ring-shaped. It will be understood that brush retainer 50 has this configuration in order to allow armature shaft 18 to penetrate through an opening 52 in brush retainer 50, where it may be engaged with the aforementioned bearing within stator end cap portion 24. Accordingly, brush retainer opening 52 is sized to have a diameter d that is larger than the diameter of armature shaft 18 and smaller than the diameter of commutator 20. In this way, it will be understood that brush retainer 50 remains in position (see FIGS. 3 and 4) until it is axially displaced along axis 54 by commutator 20 during assembly of stator 12 and rotor 14. At that time, brushes 34 are released from brush retainer 50 and biased radially into contact with commutator 20.

It will be noted that prior art brush retainers have been positioned loosely within brush holders, thereby requiring a time-consuming manual operation which has increased potential for mis-alignment. Accordingly, it is preferred that brush retainer 50 of the present invention be releasably attached to an inner surface 31 of annular wall 30 of brush holder 26, such as by a plurality of breakaway tabs 56 positioned circumferentially between an outer annular surface 58 of brush retainer 50 and annular wall 30 of brush holder 26. Although breakaway tabs 56 may have any number of potential configurations, it is preferred, as seen in the embodiments depicted in FIGS. 6A and 6B, that a base portion 60 thereof connected to outer annular surface 58 of brush retainer 50 have a greater surface area than a distal portion 62 connected to inner surface 31 of annular wall 30 so that breakaway tabs 56 will preferably disengage at the distal end 62. In this manner, breakaway tabs 56 will not interfere with the connection of commutator 20 and brushes 34.

In order to prevent brush retainer 50 from rattling about within brush holder 26 or between brush holder 26 and end cap portion 24, means 64 for capturing brush retainer 50 is provided as a part of brush holder 26. As best seen in FIG. 4, where brush retainer 50 is shown as initially positioned before assembly of DC motor 10 and thereafter in phantom as being captured by capturing means 64, it will be noted that capturing means 64 is comprised of at least two, and preferably three, leg members 66 (only one of which is shown) defined within annular wall 30 of brush holder 26. Rear leg members 66 have an inner surface 68 which includes a detent portion 70. Accordingly, as brush retainer 50 is axially displaced by commutator 20, it will be forced rearwardly along inner surface 31 of annular wall 30 until outer annular surface 58 of brush retainer 50 and/or breakaway tabs 56 engages and is captured by detent portions 70 of leg members 66. It will be understood that detent portions 70 may be of a jagged or stepped design in order to ensure better reception of brush retainer 50 therein. Nevertheless, it will be seen that capturing means 64 is able to contain brush retainer 50 within the perimeter of brush holder annular wall 30 and preferably held in such position by commutator 20.

In addition, as seen in FIGS. 3 and 4, leg members 66 include slots 72 along outer surfaces 74 thereof. Slots 72 are formed by a cambered portion 76 located at the distal end of leg members 66 and a stop 78 spaced forwardly thereof. It will be understood that slots 72 are dimensioned so as to snugly retain an inner diameter of printed circuit board 46 therein. As seen in FIG. 1, printed circuit board 46 has a central opening 80 in order to allow armature shaft 18 to pass therethrough. Therefore, the inner diameter of printed circuit board 46, as defined by central opening 80, is retained within slots 72. Thus, printed circuit board 46 is able to remain in a substantially stationary position without shifting or displacement within brush holder 26 or between brush holder 26 and stator end cap portion 24.

Having shown and described the preferred embodiment of the present invention, further adaptations of the brush holder for capturing an axially displaced brush retainer and containing the printed circuit board can be accomplished by appropriate modifications by one of ordinary skill in the art without departing from the scope of the invention.

What is claimed is:

1. A brush holder for a motor, said brush holder having an opening therethrough, comprising:

(a) at least one brush box for housing a brush biased radially toward said opening;

(b) a brush retainer releasably attached to an annular wall defining said opening; wherein said brush retainer prevents said brush from entering said opening a specified amount when said brush retainer is releasably attached to said annular wall; and (c) means for capturing said brush retainer once said brush retainer is displaced axially from said annular wall, said capturing means comprising at least two leg members located within said annular wall of said brush holder wherein said leg members have a detent surface located adjacent an inner surface of said annular wall, and said leg members each having a defined slot on an outer surface thereof, wherein a substantially ring-shaped member is retainable within said slots.

2. The brush holder of claim 1, wherein said detent surface is jagged.

3. The brush holder of claim 1, wherein said detent surface is stepped.

4. The brush holder of claim 1, said brush retainer being releasably attached to said annular wall by a plurality of breakaway tabs.

5. The brush holder of claim 1, said brush retainer being substantially ring-shaped.

6. The brush holder of claim 1, further comprising a spring member attached to said brush holder at a first end and contacting said brush at a second end, wherein said spring member biases said brush radially inward toward said opening.

7. The brush holder of claim 1, said capturing means containing said brush retainer within the perimeter of said brush holder annular wall.

8. A brush holder for a motor, said brush holder having an opening therethrough, comprising:

(a) at least one brush box for housing a brush biased radially toward said opening;

(b) a brush retainer releasably attached to an annular wall defining said opening; wherein said brush retainer prevents said brush from entering said opening a specified amount when said brush retainer is releasably attached to said annular wall, and (c) means for capturing said brush retainer after displacement thereof, said capturing means comprising at least two leg members defined within an annular wall of said brush holder, wherein said leg members have a detent surface located adjacent an inner surface of said annular wall defining said opening, and said leg members each having a defined slot on an outer surface thereof, wherein a substantially ring-shaped member is retainable within said slots.

9. The brush holder of claim 8, wherein said detent surface is jagged.

10. The brush holder of claim 8, wherein said detent surface is stepped.

11. The brush holder of claim 8, said capturing means containing said brush retainer within the perimeter of said brush holder annular wall.

12. The brush holder of claim 8, said slots being defined by a cambered portion located adjacent a distal end of said leg members and a stop spaced forwardly of said cambered portion.

* * * * *